(12) United States Patent
Tinnin et al.

(10) Patent No.: US 8,021,235 B2
(45) Date of Patent: Sep. 20, 2011

(54) ROLLING ELEMENT SHAFT ASSEMBLY

(75) Inventors: Melvin L. Tinnin, Clio, MI (US);
Arthur W. Nellett, Davison, MI (US);
William D. Cymbal, Freeland, MI (US);
Richard K. Riefe, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 360 days.

(21) Appl. No.: 12/335,850

(22) Filed: Dec. 16, 2008

(65) Prior Publication Data

US 2010/0151950 A1    Jun. 17, 2010

(51) Int. Cl.
*F16C 3/03* (2006.01)
(52) U.S. Cl. .............. 464/167; 464/906; 384/51; 384/56
(58) Field of Classification Search .............. 464/162, 464/167, 168, 906; 384/46, 49, 50, 51, 53, 384/56; 74/492, 493; 280/775
See application file for complete search history.

(56) References Cited

U.S. PATENT DOCUMENTS

| | | | | |
|---|---|---|---|---|
| 2,371,330 | A | * | 3/1945 | Irstad .............................. 464/167 |
| 2,605,622 | A | * | 8/1952 | Anderson ...................... 464/167 |
| 4,705,491 | A | | 11/1987 | Andersson |
| 4,898,566 | A | | 2/1990 | Hakansson |
| 5,115,691 | A | * | 5/1992 | Beauch .......................... 464/167 |
| 6,217,456 | B1 | | 4/2001 | Jacob |
| 6,350,203 | B1 | | 2/2002 | Zernickel |
| 6,805,637 | B2 | | 10/2004 | Daenzer et al. |
| 6,942,417 | B2 | | 9/2005 | Schwarzbich |
| 6,948,401 | B2 | | 9/2005 | Zernickel et al. |
| 7,018,299 | B2 | | 3/2006 | da Silva |
| 7,174,803 | B2 | | 2/2007 | Reiche et al. |
| 7,232,372 | B2 | * | 6/2007 | Nagatani et al. .............. 464/111 |

FOREIGN PATENT DOCUMENTS

WO    WO 2008/147287    * 12/2008

* cited by examiner

*Primary Examiner* — Gregory Binda
*Assistant Examiner* — Josh Skroupa
(74) *Attorney, Agent, or Firm* — Cantor Colburn LLP (57) ABSTRACT

A shaft assembly includes a first shaft member and a second shaft member telescopically engaged with the first shaft member. A roller carrier supporting a plurality of rollers is disposed between the first and second shaft members. The first shaft member defines a first slot extending along and angled relative to a longitudinal axis. The second shaft member defines a second slot extending along and angled relative to the first slot and the longitudinal axis. The roller carrier defines a carrier slot extending transverse to the longitudinal axis. A pin extends through the first slot, the second slot and the carrier slot and moves the roller carrier at a slower speed than the relative movement speed between the first shaft member and the second shaft member during telescoping movement. A wedge is disposed between the first shaft member and a portion of the rollers to de-lash the shaft assembly.

26 Claims, 6 Drawing Sheets

ROLLING ELEMENT SHAFT ASSEMBLY

BACKGROUND OF THE INVENTION

1. Field of the Invention

The subject invention generally relates to a shaft assembly for transmitting a torque, and more specifically to a telescoping intermediate shaft assembly for transmitting a torque in a steering column.

2. Description of the Prior Art

Telescoping shaft assemblies capable of transmitting a torque are often utilized in steering columns as an intermediate shaft. The intermediate shaft assemblies typically include a tubular outer shaft member and an inner shaft member. The inner shaft member is at least partially disposed within the tubular outer shaft member, and is moveable relative to the outer shaft member along a longitudinal axis. The intermediate shaft assemblies typically utilize rolling elements between the outer shaft member and the inner shaft member to reduce friction therebetween.

The rolling elements of the intermediate shaft assemblies typically include linear bearings, and often include steel rollers or steel balls. Manufacturing tolerances cause small clearances to exist between the rolling elements and the outer and inner shaft members. This small clearance is undesirable. Accordingly, the intermediate shaft assemblies include a de-lashing mechanism, such as a resilient material or spring, to remove the small clearance between the rolling elements and the outer and inner shaft members. The de-lashing mechanisms typically pre-load the rolling elements against the outer and inner shaft members. The rolling elements of such intermediate shaft assemblies often fail to roll between the outer and inner shaft members, i.e., the rolling elements skid between the outer and inner shaft members, thereby increasing friction during the telescoping movement of the intermediate shaft assemblies.

SUMMARY OF THE INVENTION AND ADVANTAGES

The subject invention provides a shaft assembly for transmitting a torque. The shaft assembly comprises a first shaft member extending along a longitudinal axis. The first shaft member defines an interior and further defines a first slot extending along and angled relative to the longitudinal axis. A second shaft member is at least partially disposed within the interior of the first shaft member. The second shaft member is telescopically moveable at a telescoping speed along the longitudinal axis relative to the first shaft member. The second shaft member defines a second slot extending along the longitudinal axis and angled relative to both the longitudinal axis and the first slot. A roller carrier is disposed within the interior of the first shaft member, between the first shaft member and the second shaft member. The roller carrier defines a carrier slot. A pin extends through the first slot, the carrier slot and the second slot for interconnecting the first shaft member, the roller carrier and the second shaft member. The pin is moveable within the first slot and the second slot in both a longitudinal direction along the longitudinal axis and a transverse direction transverse to the longitudinal axis. The pin moves in response to the telescopic movement of the second shaft member relative to the first shaft member to move the roller carrier relative to the first shaft member and the second shaft member at a carrier speed less than the telescoping speed.

The subject invention further provides a shaft assembly for transmitting a torque. The shaft assembly comprises a first shaft member extending along a longitudinal axis. The first shaft member defines an interior. The second shaft member is at least partially disposed within the interior of the first shaft member and is telescopically moveable along the longitudinal axis relative to the first shaft member. A roller carrier is disposed within the interior of the first shaft member, between the first shaft member and the second shaft member. The roller carrier defines a plurality of openings. The shaft assembly includes a plurality of rollers, with one of the plurality of rollers disposed within each of the plurality of openings. The plurality of rollers engages the first shaft member and the second shaft member in rolling engagement. A wedge is longitudinally fixed relative to the first shaft member, and is disposed within the interior between the first shaft member and a portion of the plurality of rollers. A biasing device biases the wedge into wedging engagement between the first shaft member and the portion of the plurality of rollers for wedging the portion of the plurality of rollers against the second shaft member and for de-lashing a remainder of the portion of the plurality of rollers relative to the first shaft member and the second shaft member.

Accordingly, the subject invention provides a telescoping shaft assembly in which the roller carrier and the rollers move at a speed different than a speed the first shaft member and the second shaft member move at during telescoping movement. This variation of speeds between the rollers and the first and second shaft members promotes the rolling engagement between the rollers and the first and second shaft members. Additionally, the wedge removes the lash between the rollers and the first and second shaft members.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a shaft assembly is shown generally at 20. The shaft assembly 20 is a telescoping shaft assembly 20 capable of transmitting a torque. The shaft assembly 20 may be incorporated into any suitable device. However, the shaft assembly 20 is particularly suited for use as an intermediate shaft in a steering column of a vehicle.

Figure 1:
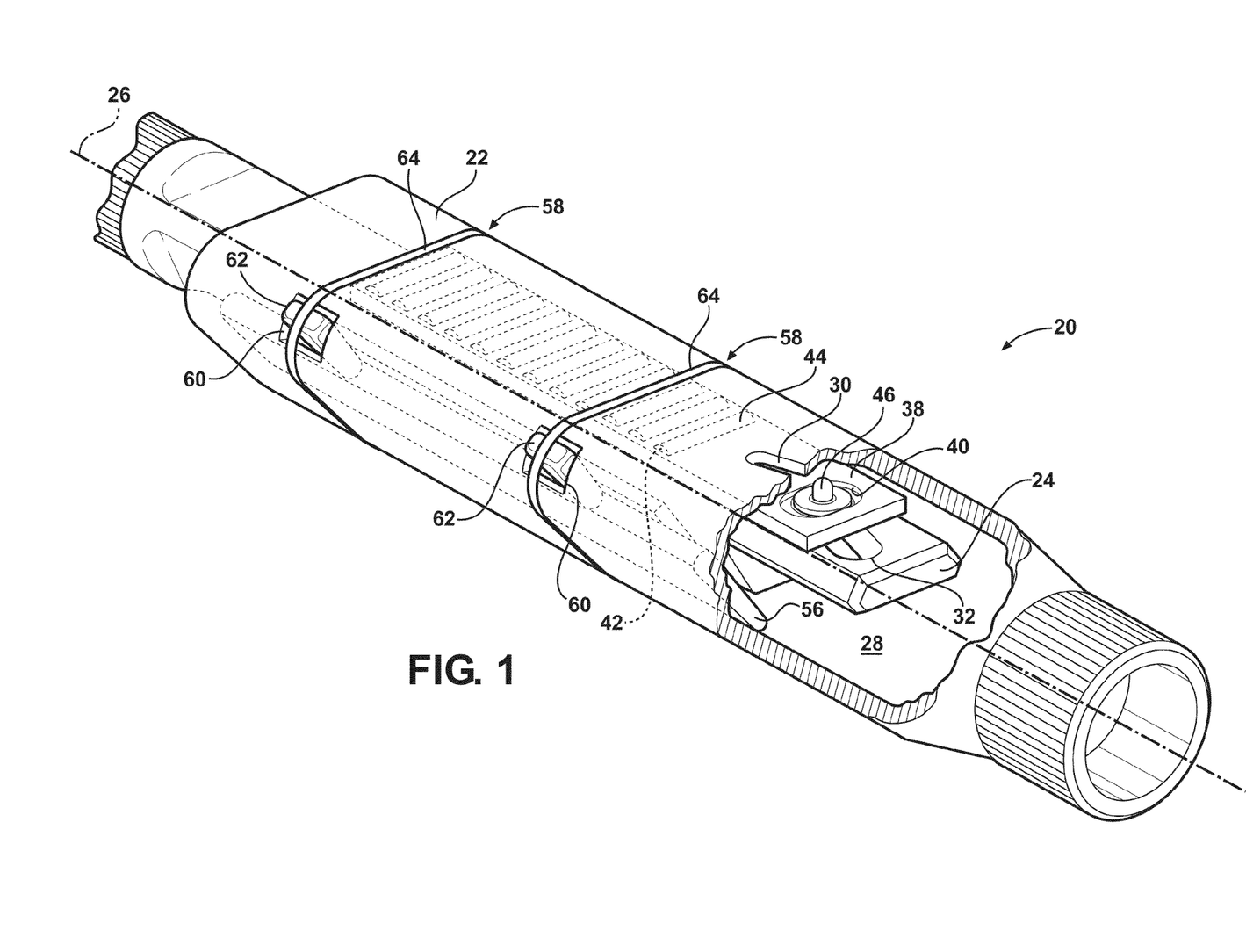
FIG. 1 is a partial perspective view of a shaft assembly.
Figure 2:
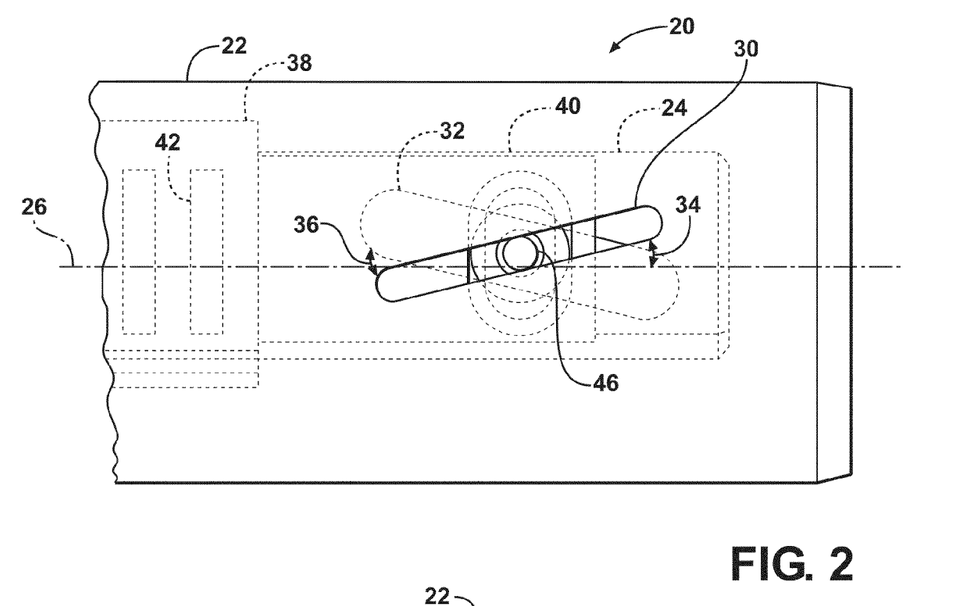
FIG. 2 is a fragmentary plan view of the shaft assembly.
Figure 3:
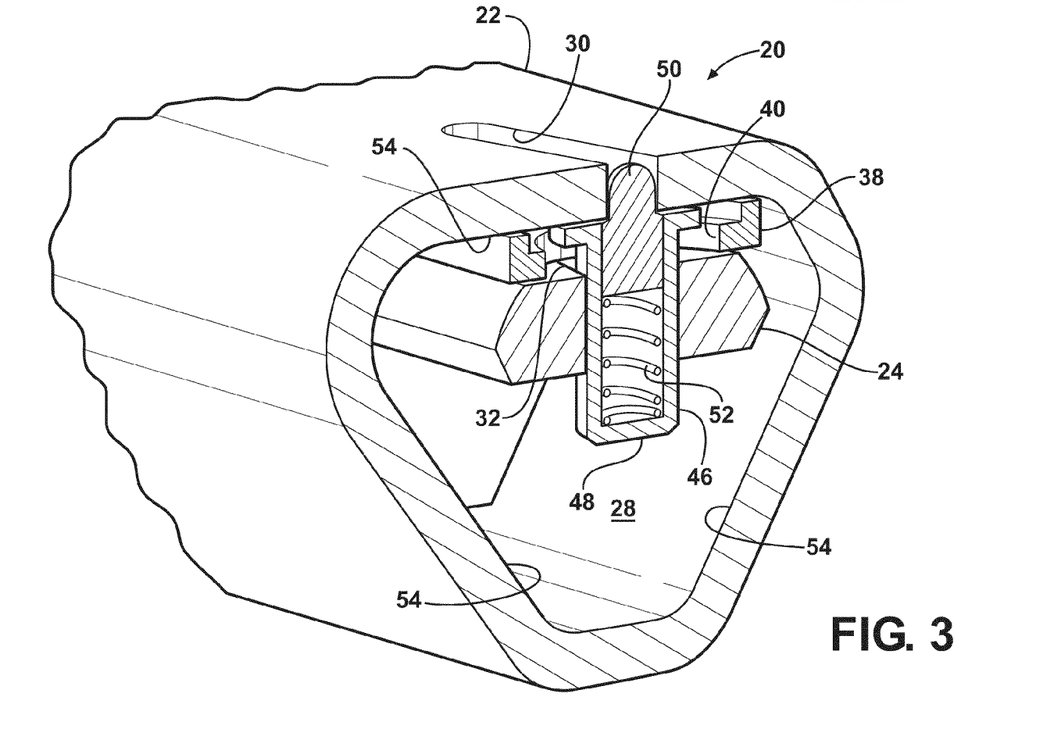
FIG. 3 is a perspective cross sectional view of the shaft assembly.
Figure 4:
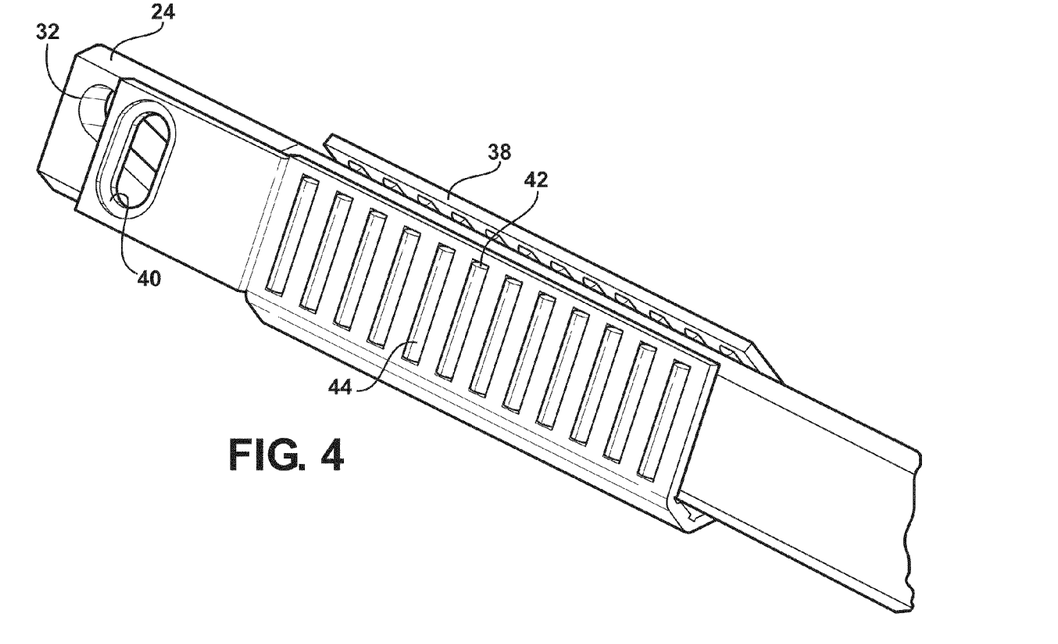
FIG. 4 is a partial perspective view of the shaft assembly.
Figure 6:
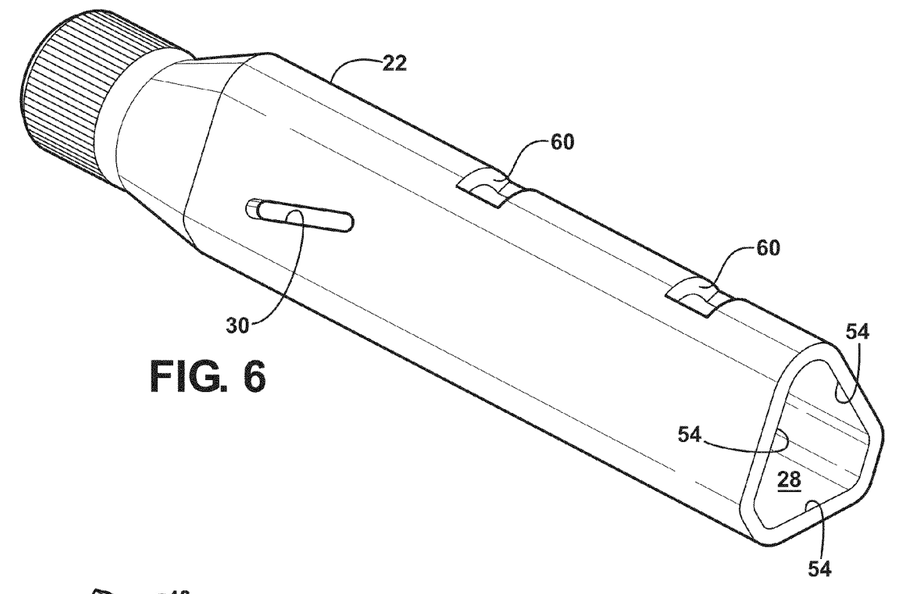
FIG. 6 is a perspective view of a first shaft member of the shaft assembly.

Referring to FIGS. 1 through 3, the shaft assembly 20 includes a first shaft member 22 and a second shaft member 24 telescopically engaged with the first shaft member 22. The first shaft member 22 extends along a longitudinal axis 26, and includes a wall defining an interior 28. Referring also to FIG. 6, it should be appreciated that the first shaft member 22 is generally tubular. The wall of the first shaft member 22 further defines a first slot 30. The first slot 30 extends along the longitudinal axis 26, and is also angled relative to the longitudinal axis 26. As such, the first slot 30 is disposed generally parallel to and laterally spaced from a plane extending through the longitudinal axis 26, and extends along a path having a different direction than that of the longitudinal axis 26. In other words, a projection of the path of the first slot 30 on the plane of the longitudinal axis 26 intersects the longitudinal axis 26.

Referring to FIGS. 1 through 5, the second shaft member 24 is at least partially disposed within the interior 28 of the first shaft member 22. The second shaft member 24 is telescopically moveable relative to the first shaft member 22 along the longitudinal axis 26. The second shaft member 24 is telescopically moveable relative to the first shaft member 22 at a telescoping speed. The second shaft member 24 defines a second slot 32. The second slot 32 extends along the longitudinal axis 26, and is also angled relative to both the longitudinal axis 26 and the first slot 30. As such, the second slot 32 is disposed generally parallel to and laterally spaced from the plane extending through the longitudinal axis 26, and extends along a path having a different direction than that of the longitudinal axis 26 and the path of the first slot 30. In other words, a projection of the path of the second slot 32 on the plane of the longitudinal axis 26 intersects both the longitudinal axis 26 and the projection of the path of the first slot 30 on the plane.

As best shown in FIG. 2, the first slot 30 defines a first angle 34 relative to the longitudinal axis 26. More specifically, the projection of the first slot 30 on the longitudinal plane and the longitudinal axis 26 intersect to form the first angle 34. The second slot 32 defines a second angle 36 relative to the longitudinal axis 26. More specifically, the projection of the second slot 32 on the longitudinal plane and the longitudinal axis 26 intersect to form the second angle 36. The first angle 34 and the second angle 36 each including an absolute value greater than zero degrees and less than ninety degrees. For example, assuming a standard Cartesian coordinate system having one of the axis based along the longitudinal axis 26, one of the first angle 34 and the second angle 36 may include a negative value and the other may include a positive value. However, the absolute value of both the first angle 34 and the second angle 36 is greater than zero degrees and less than ninety degrees. Additionally, the absolute value of the first angle 34 is equal in magnitude to the absolute value of the second angle 36. Preferably, one of the first angle 34 and the second angle 36 is equal to negative forty five degrees and the other of the first angle 34 and the second angle 36 is equal to positive forty five degrees. Accordingly, the absolute value of the first angle 34 relative to the longitudinal axis 26 and the absolute value of the second angle 36 relative to the longitudinal axis 26 are each equal to forty five degrees. However, it should be appreciated that the value of the first angle 34 and the second angle 36 may vary from the preferred forty five degree angle. As shown in the Figures, the first angle 34 and the second angle 36 include an absolute value of approximately twenty degrees.

Figure 5:
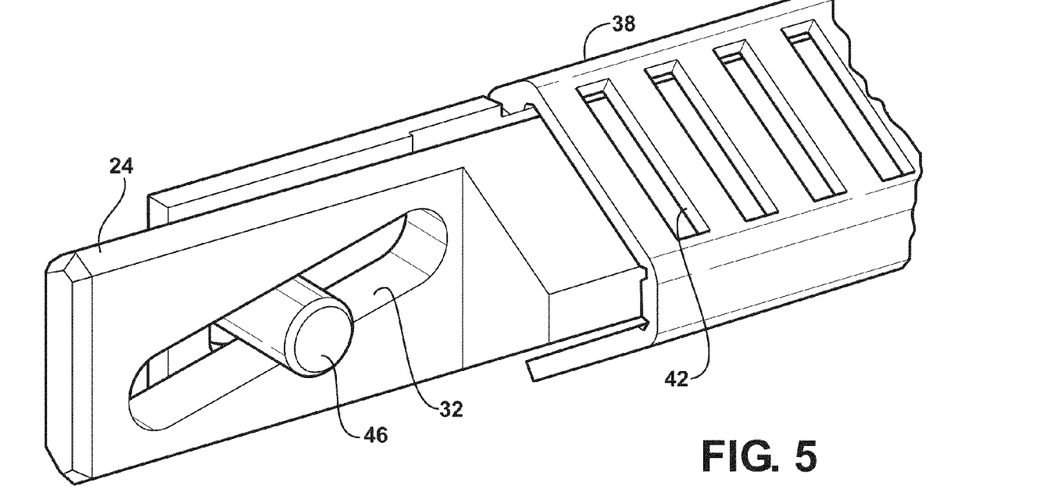
FIG. 5 is a partial perspective view of the shaft assembly.
Figure 7:
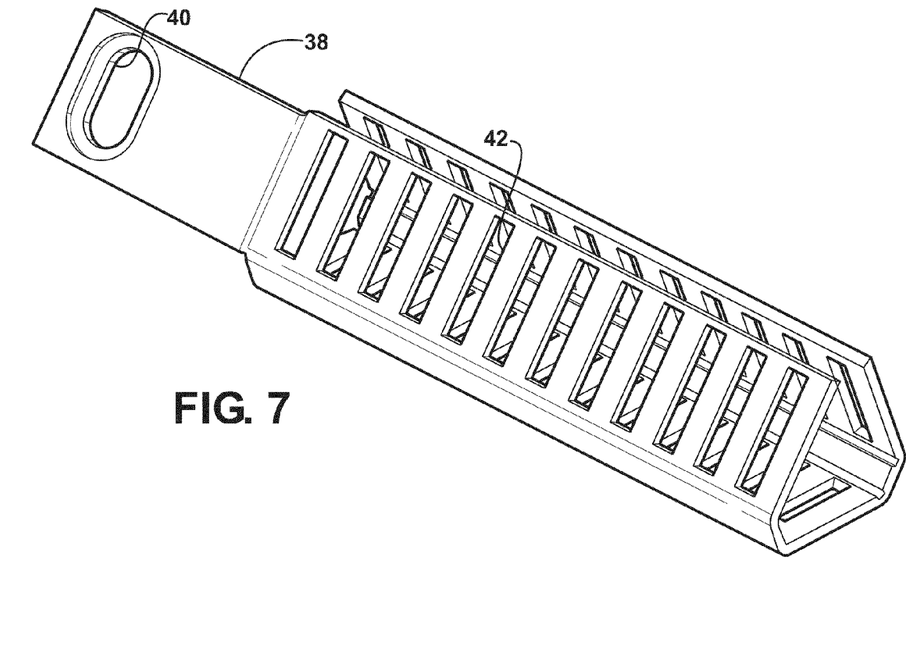
FIG. 7 is a perspective view of a roller carrier of the shaft assembly.

Referring to FIGS. 1 through 4, a roller carrier 38 is disposed within the interior 28 of the first shaft member 22. The roller carrier 38 is disposed between the first shaft member 22 and the second shaft member 24. Referring also to FIGS. 5 and 7, the roller carrier 38 defines a carrier slot 40. The carrier slot 40 extends transverse to the longitudinal axis 26, and is aligned with both the first slot 30 and the second slot 32 to continuously overlap both the first slot 30 and the second slot 32 during telescoping movement of the first shaft member 22 relative to the second shaft member 24. As such, a projection of the carrier slot 40 on the plane of the longitudinal axis 26 intersects the longitudinal axis 26 at a perpendicular angle, and intersects the projection of the first slot 30 and the projection of the second slot 32 on the plane of the longitudinal axis 26.

The roller carrier 38 defines a plurality of openings 42. The shaft assembly 20 includes a plurality of rollers 44, with one of the plurality of rollers 44 disposed within each of the plurality of openings 42. The rollers 44 engage the first shaft member 22 and the second shaft member 24 in rolling engagement during telescoping movement of the first shaft member 22 and the second shaft member 24.

Referring to FIGS. 2, 3 and 5, a pin 46 extends through the first slot 30, the carrier slot 40 and the second slot 32. Accordingly, the pin 46 interconnects the first shaft member 22, the roller carrier 38 and the second shaft member 24. The pin 46 is moveable within the first slot 30 and the second slot 32 in both a longitudinal direction along the longitudinal axis 26 and a transverse direction transverse to the longitudinal axis 26 in response to the telescopic movement of the second shaft member 24 relative to the first shaft member 22. The pin 46 is moveable within the carrier slot 40 in the transverse direction transverse to the longitudinal axis 26 in response to the telescopic movement of the second shaft member 24 relative to the first shaft member 22.

The movement of the pin 46 within the first slot 30, the carrier slot 40 and the second slot 32 moves the roller carrier 38 relative to the first shaft member 22 and the second shaft member 24 at a carrier speed less than the telescoping speed during telescoping movement of the first shaft member 22 and the second shaft member 24. In other words, the orientation of the first slot 30 and the second slot 32 cooperate in such a manner so that the pin 46 moves within the first slot 30 and the second slot 32 relative to the first shaft member 22 and the second shaft member 24 at the carrier speed, which is less than the telescoping speed, i.e., the relative speed of movement between the first shaft member 22 and the second shaft member 24. The carrier slot 40 permits the pin 46 to move transversely relative to the roller carrier 38 as the pin 46, and thereby the roller carrier 38 move longitudinally along the longitudinal axis 26. The difference in speeds between the roller carrier 38, and the rollers 44 supported thereby, and the first shaft member 22 and the second shaft member 24 promotes the rolling engagement between the rollers 44 and the first shaft member 22 and the second shaft member 24, i.e., helps prevent skidding of the rollers 44 along the first shaft member 22 and the second shaft member 24. In the preferred embodiment, wherein the absolute values of the first angle 34 and the second angle 36 are each equal to forty five degrees, the carrier speed is equal to one half the telescoping speed.

As shown in FIG. 3, the pin 46 includes a base portion 48 and a plunger portion 50. The plunger portion 50 is at least partially disposed within, and moveable within the base portion 48. The pin 46 further includes a plunger spring 52 disposed within the base portion 48. The plunger spring 52 biases the plunger portion 50 outward away from the base portion 48, thus creating a retractable pin 46 mechanism. The retractable pin 46 mechanism allows for easy manufacture of the shaft assembly 20. However, it should be appreciated that the pin 46 may alternatively include a solid rod or the like.

Referring to FIG. 3, the first shaft member 22, the second shaft member 24 and the roller carrier 38 each include a cross section perpendicular to the longitudinal axis 26 that is complimentary in shape to each other. The complimentary cross sectional shape of the first shaft member 22, the second shaft member 24 and the roller carrier 38 defines a plurality of planar portions 54 disposed radially about the longitudinal axis 26. As shown, the complimentary cross sections of the first shaft member 22, the second shaft member 24 and the roller carrier 38 include a triangular shape, with the number of the planar portions 54 being equal to three. However, it should be appreciated that the complimentary cross sectional shape of the first shaft member 22, the second shaft member 24 and the roller carrier 38 may include a shape other than triangular, such as rectangular, hexagonal, etc., with the number of planar portions 54 being equal to four for a rectangular cross sectional shape and the number of planar portions 54 being equal to six for a hexagonal cross sectional shape.

At least one of the plurality of openings 42 of the roller carrier 38 and at least one of the plurality of rollers 44 are disposed adjacent each of the plurality of planar portions 54 of the first shaft member 22 and the second shaft member 24. Preferably, the plurality of openings 42 and the plurality of rollers 44 are evenly distributed across all of the planar portions 54 of the first shaft member 22, the second shaft member 24 and the roller carrier 38 to evenly distribute the torque between the first shaft member 22 and the second shaft member 24.

Figure 8:
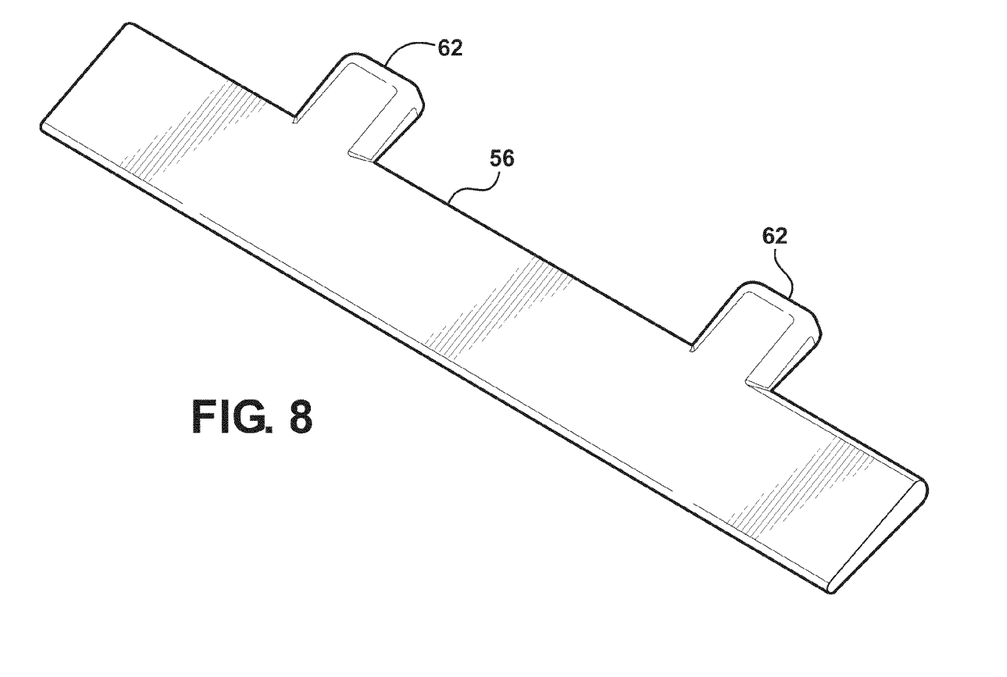
FIG. 8 is a perspective view of a wedge of the shaft assembly.

Referring to FIG. 1, a wedge 56 is longitudinally fixed along the longitudinal axis 26 relative to the first shaft member 22, and is disposed within the interior 28 of the first shaft member 22. The wedge 56 is disposed between the first shaft member 22 and a portion of the plurality of rollers 44. More specifically, the wedge 56 is disposed between the first shaft member 22 and the portion of the plurality of rollers 44 disposed adjacent one of the planar portions 54 of the roller carrier 38. Preferably, the wedge 56 comprises a metal, such as steel. However, it should be appreciated that the wedge 56 may comprise and be manufactured from a material other than steel. Referring also to FIG. 8, the wedge 56 includes a wedge 56 angle, dependent upon the coefficient of friction of the material comprising the wedge 56, to provide a desired, wedging, i.e., locking, force. For steel, the preferably wedge 56 angle is substantially equal to eight degrees. However, it should be appreciated that the wedge 56 angle for the steel wedge 56 may vary from the preferred eight degrees, such as between the range of six degrees and ten degrees. It should also be appreciated that the wedge 56 angle for a wedge 56 comprising material other than steel may be significantly different than the wedge 56 angle for the steel wedge 56.

A biasing device 58 biases the wedge 56 into wedging engagement between the first shaft member 22 and the portion of the plurality of rollers 44 disposed adjacent to and abutting the wedge 56. The wedging engagement wedges 56 the portion of the plurality of rollers 44 disposed against wedge 56 into the second shaft member 24. The wedging engagement also de-lashes a remainder of the portion of the plurality of rollers 44 relative to the first shaft member 22 and the second shaft member 24. Accordingly, the wedging engagement between the portion of rollers 44 and the second shaft member 24 urges the second shaft member 24 into tight engagement with the remainder of the rollers 44 to remove any lash between the remainder of the rollers 44 and the first shaft member 22 and the second shaft member 24.

As shown in the Figures, the first shaft member 22, the second shaft member 24 and the roller carrier 38 each include the triangular cross sectional shape perpendicular to the longitudinal axis 26. Accordingly, only a single wedge 56 is required to de-lash the shaft assembly 20. However, it should be appreciated that if the first shaft member 22, the second shaft member 24 and the roller carrier 38 include a cross sectional shape having a number of planar portions 54 greater than three, such as a rectangular shape having a plurality of planar portions 54 equal to four, than the shaft assembly 20 will require multiple wedges 56 to de-lash the shaft assembly 20 in all directions about the longitudinal axis 26.

The wall of the first shaft member 22 defines at least one aperture 60 extending through the wall, transverse to the longitudinal axis 26. Preferably, and as shown, the first shaft member 22 defines two apertures 60. The wedge 56 includes at least one tab 62 extending through the at least one aperture 60. Preferably, and as shown, the first shaft member 22 includes two tabs 62 extending through the apertures 60 in spaced relationship relative to each other along the longitudinal axis 26. The biasing device 58 engages the at least one tab 62 from an exterior of the first shaft member 22. The biasing device 58 compresses or urges the tabs 62 of the wedge 56 into the interior 28 of the first shaft member 22 to drive the wedge 56 into the wedging engagement described above. Accordingly, the shaft assembly 20 may be de-lashed after assembly 20 of the first shaft member 22, the second shaft member 24, the roller carrier 38 and the rollers 44.

As shown in FIG. 1, the biasing device 58 may include a band 64 encircling the first shaft member 22, with the band 64 engaging the at least one tab 62 in compressive engagement for biasing the wedge 56 into the wedging engagement. The band 64 may be rigid, or alternatively, the band 64 may include an elastic band, such as a rubber band. Alternatively, the band 64 may include a compressive wrap 66 extending along the longitudinal axis 26 a pre-determined length of the first shaft member 22.

Figure 9:
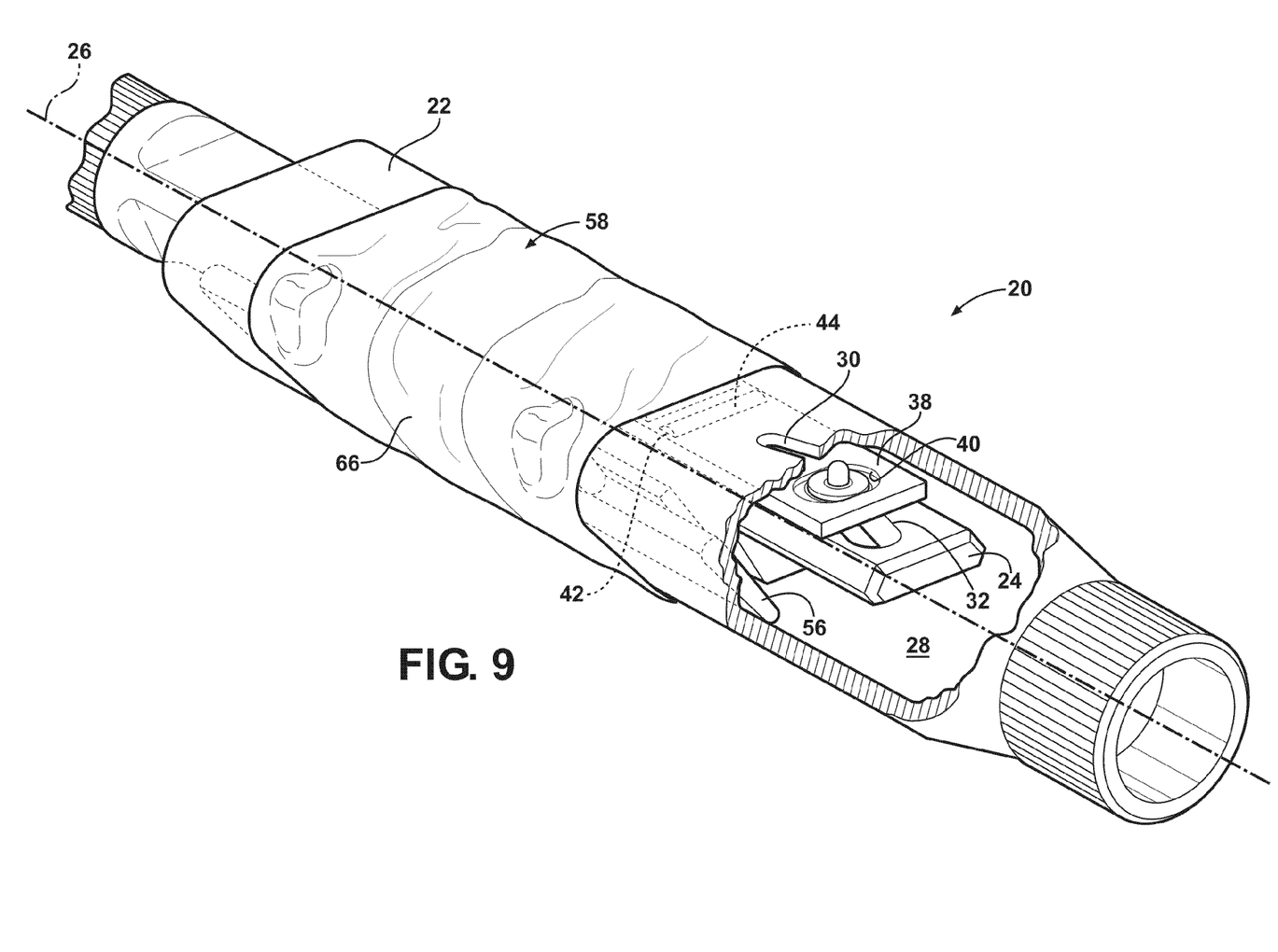
FIG. 9 is a partial perspective view of a first alternative embodiment of the shaft assembly.

Referring to FIG. 9, a first alternative embodiment of the shaft assembly 20 is shown. In the first alternative embodiment of the shaft assembly 20, the biasing device 58 includes the compressive wrap 66 encircling at least a portion of the first shaft member 22. The compressive wrap 66 engages the at least one tab 62 in compressive engagement for biasing the wedge 56 into the wedging engagement. The compressive wrap 66 may include, but is not limited to, a plastic shrink wrap or the like.

Figure 10:
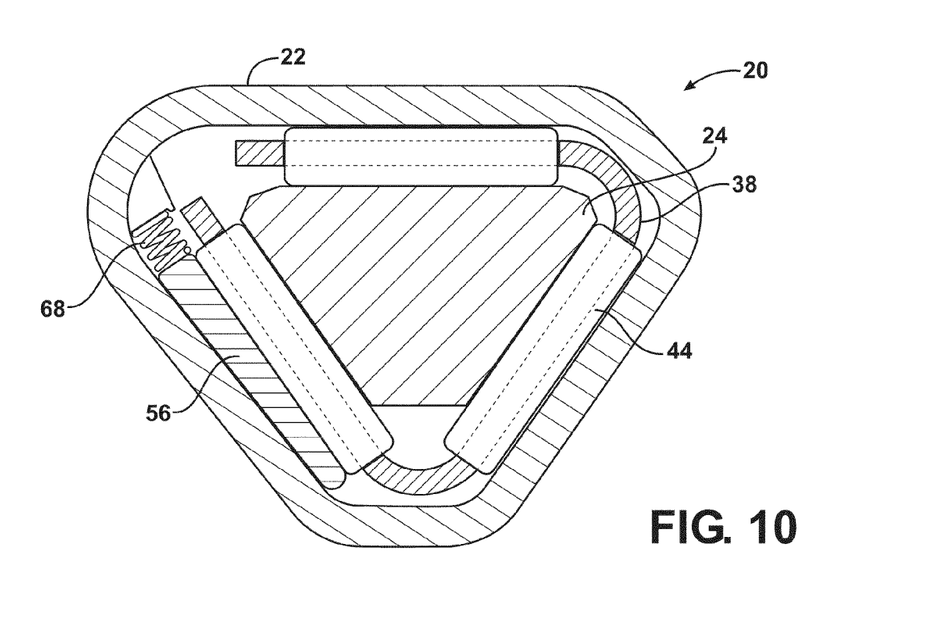
FIG. 10 is a cross sectional view of a second alternative embodiment of the shaft assembly.

Referring to FIG. 10, a second alternative embodiment of the shaft assembly 20 is shown. In the second alternative embodiment of the shaft assembly 20, the biasing device 58 includes a wedge spring 68. The wedge spring 68 is disposed within the interior 28 of the first shaft member 22. The wedge spring 68 biases the wedge 56 against the first shaft member 22 to drive the wedge 56 into the wedging engagement described above. The wedge spring 68 may include, but is not limited to, a spring chosen from a group of wedge springs comprising a leaf spring and a coil spring.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shaft assembly for transmitting a torque, said shaft assembly comprising:
   a first shaft member extending along a longitudinal axis and defining an interior and further defining a first slot extending along and angled relative to said longitudinal axis;

a second shaft member at least partially disposed within said interior of said first shaft member and telescopically moveable at a telescoping speed along said longitudinal axis relative to said first shaft member with said second shaft member defining a second slot extending along said longitudinal axis and angled relative to both said longitudinal axis and said first slot;

a roller carrier disposed within said interior of said first shaft member between said first shaft member and said second shaft member and defining a carrier slot; and a pin extending through said first slot, said carrier slot and said second slot for interconnecting said first shaft member, said roller carrier and said second shaft member with said pin moveable within said first slot and said second slot in both a longitudinal direction along said longitudinal axis and a transverse direction transverse to said longitudinal axis in response to said telescopic movement of said second shaft member relative to said first shaft member to move said roller carrier relative to said first shaft member and said second shaft member at a carrier speed less than said telescoping speed, said pin including a base portion and a plunger portion at least partially disposed and moveable within said base portion.

2. A shaft assembly as set forth in claim 1 wherein said carrier slot extends transverse to said longitudinal axis with said pin moveable within said carrier slot in said transverse direction transverse to said longitudinal axis in response to said telescopic movement of said second shaft member relative to said first shaft member.

3. A shaft assembly as set forth in claim 2 wherein said first slot defines a first angle relative to said longitudinal axis and said second slot defines a second angle relative to said longitudinal axis with said first angle and said second angle each including an absolute value greater than zero degrees and less than ninety degrees.

4. A shaft assembly as set forth in claim 3 wherein said absolute value of said first angle is equal in magnitude to said absolute value of said second angle.

5. A shaft assembly as set forth in claim 4 wherein said absolute value of said first angle relative to said longitudinal axis and said absolute value of said second angle relative to said longitudinal axis are each equal to forty five degrees.

6. A shaft assembly as set forth in claim 1 wherein said roller carrier defines a plurality of openings.

7. A shaft assembly as set forth in claim 6 further comprising a plurality of rollers with one of said plurality of rollers disposed within each of said plurality of openings for engaging said first shaft member and said second shaft member in rolling engagement.

8. A shaft assembly as set forth in claim 7 further comprising a wedge longitudinally fixed along said longitudinal axis relative to said first shaft member and disposed within said interior between said first shaft member and a portion of said plurality of rollers.

9. A shaft assembly as set forth in claim 8 further comprising a biasing device biasing said wedge into wedging engagement between said first shaft member and said portion of said plurality of rollers for wedging said portion of said plurality of rollers against said second shaft member and for de-lashing a remainder of said portion of said plurality of rollers relative to said first shaft member and said second shaft member.

10. A shaft assembly as set forth in claim 9 wherein said biasing device includes a wedge spring disposed within said interior and biasing said wedge against said first shaft member.

11. A shaft assembly as set forth in claim 9 wherein said first shaft member defines at least one aperture extending transverse to said longitudinal axis and said wedge includes at least one tab extending through said at least one aperture with said biasing device engaging said at least one tab from an exterior of said first shaft member.

12. A shaft assembly as set forth in claim 11 wherein said biasing device includes a band encircling said first shaft member and engaging said at least one tab in compressive engagement for biasing said wedge into said wedging engagement.

13. A shaft assembly as set forth in claim 1 wherein said pin includes a plunger spring disposed within said base portion for biasing said plunger portion outward away from said base portion.

14. A shaft assembly for transmitting a torque, said shaft assembly comprising:
   a first shaft member extending along a longitudinal axis and defining an interior and further defining a first slot extending along and angled relative to said longitudinal axis;
   a second shaft member at least partially disposed within said interior of said first shaft member and telescopically moveable at a telescoping speed along said longitudinal axis relative to said first shaft member with said second shaft member defining a second slot extending along said longitudinal axis and angled relative to both said longitudinal axis and said first slot;
   a roller carrier disposed within said interior of said first shaft member between said first shaft member and said second shaft member and defining a carrier slot, said roller carrier defining a plurality of openings;
   a pin extending through said first slot, said carrier slot and said second slot for interconnecting said first shaft member, said roller carrier and said second shaft member with said pin moveable within said first slot and said second slot in both a longitudinal direction along said longitudinal axis and a transverse direction transverse to said longitudinal axis in response to said telescopic movement of said second shaft member relative to said first shaft member to move said roller carrier relative to said first shaft member and said second shaft member at a carrier speed less than said telescoping speed; and
   a plurality of rollers with one of said plurality of rollers disposed within each of said plurality of openings for engaging said first shaft member and said second shaft member in rolling engagement;
   wherein said first shaft member, said second shaft member and said roller carrier each include a cross section perpendicular to said longitudinal axis that is complimentary in shape to each other and defines a plurality of planar portions.

15. A shaft assembly as set forth in claim 14 wherein at least one of said plurality of openings of said roller carrier and at least one of said plurality of rollers are disposed adjacent each of said plurality of planar portions of said first shaft member and said second shaft member.

16. A shaft assembly as set forth in claim 14 wherein said complimentary cross sections of said first shaft member, said second shaft member and said roller carrier include a triangular shape and said number of said planar portions is equal to three.

17. A shaft assembly for transmitting a torque, said shaft assembly comprising:
   a first shaft member extending along a longitudinal axis and defining an interior;

a second shaft member at least partially disposed within said interior of said first shaft member and telescopically moveable along said longitudinal axis relative to said first shaft member;

a roller carrier disposed within said interior of said first shaft member between said first shaft member and said second shaft member and defining a plurality of openings;

a plurality of rollers with one of said plurality of rollers disposed within each of said plurality of openings for engaging said first shaft member and said second shaft member in rolling engagement;

a wedge longitudinally fixed relative to said first shaft member and disposed within said interior between said first shaft member and a portion of said plurality of rollers; and a biasing device biasing said wedge into wedging engagement between said first shaft member and said portion of said plurality of rollers for wedging said portion of said plurality of rollers against said second shaft member and for de-lashing a remainder of said portion of said plurality of rollers relative to said first shaft member and said second shaft member;

wherein said biasing device includes a wedge spring disposed within said interior and biasing said wedge against said first shaft member.

18. A shaft assembly as set forth in claim 17 wherein said wedge spring includes a wedge spring chosen from a group of springs comprising a leaf spring and a coil spring.

19. A shaft assembly as set forth in claim 17 wherein said wedge comprises a metal.

20. A shaft assembly for transmitting a torque, said shaft assembly comprising:

a first shaft member extending along a longitudinal axis and defining an interior;

a second shaft member at least partially disposed within said interior of said first shaft member and telescopically moveable along said longitudinal axis relative to said first shaft member;

a roller carrier disposed within said interior of said first shaft member between said first shaft member and said second shaft member and defining a plurality of openings;

a plurality of rollers with one of said plurality of rollers disposed within each of said plurality of openings for engaging said first shaft member and said second shaft member in rolling engagement;

a wedge longitudinally fixed relative to said first shaft member and disposed within said interior between said first shaft member and a portion of said plurality of rollers; and a biasing device biasing said wedge into wedging engagement between said first shaft member and said portion of said plurality of rollers for wedging said portion of said plurality of rollers against said second shaft member and for de-lashing a remainder of said portion of said plurality of rollers relative to said first shaft member and said second shaft member;

wherein said first shaft member defines at least one aperture extending transverse to said longitudinal axis and said wedge includes at least one tab extending through said at least one aperture with said biasing device engaging said at least one tab from an exterior of said first shaft member.

21. A shaft assembly as set forth in claim 20 wherein said biasing device includes a compressive wrap encircling at least a portion of said first shaft member and engaging said at least one tab in compressive engagement for biasing said wedge into said wedging engagement.

22. A shaft assembly as set forth in claim 20 wherein said biasing device includes an elastic band encircling said first shaft member and engaging said at least one tab in compressive engagement for biasing said wedge into said wedging engagement.

23. A shaft assembly for transmitting a torque, said shaft assembly comprising:

a first shaft member extending along a longitudinal axis and defining an interior;

a second shaft member at least partially disposed within said interior of said first shaft member and telescopically moveable along said longitudinal axis relative to said first shaft member;

a roller carrier disposed within said interior of said first shaft member between said first shaft member and said second shaft member and defining a plurality of openings;

a plurality of rollers with one of said plurality of rollers disposed within each of said plurality of openings for engaging said first shaft member and said second shaft member in rolling engagement;

a wedge longitudinally fixed relative to said first shaft member and disposed within said interior between said first shaft member and a portion of said plurality of rollers; and a biasing device biasing said wedge into wedging engagement between said first shaft member and said portion of said plurality of rollers for wedging said portion of said plurality of rollers against said second shaft member and for de-lashing a remainder of said portion of said plurality of rollers relative to said first shaft member and said second shaft member;

wherein said first shaft member, said second shaft member and said roller carrier each include a cross section perpendicular to said longitudinal axis that is complimentary in shape to each other and defines a plurality of planar portions.

24. A shaft assembly as set forth in claim 23 wherein at least one of said plurality of openings and said plurality of rollers is disposed adjacent each of said plurality of planar portions of said first shaft member and said second shaft member.

25. A shaft assembly as set forth in claim 24 wherein said complimentary cross sections of said first shaft member, said second shaft member and said roller carrier includes a triangular shape and said number of said planar portions is equal to three.

26. A shaft assembly for transmitting a torque, said shaft assembly comprising:

a first shaft member extending along a longitudinal axis and defining an interior;

a second shaft member at least partially disposed within said interior of said first shaft member and telescopically moveable along said longitudinal axis relative to said first shaft member;

a roller carrier disposed within said interior of said first shaft member between said first shaft member and said second shaft member and defining a plurality of openings;

a plurality of rollers with one of said plurality of rollers disposed within each of said plurality of openings for engaging said first shaft member and said second shaft member in rolling engagement;

a wedge longitudinally fixed relative to said first shaft member and disposed within said interior between said first shaft member and a portion of said plurality of rollers; and a biasing device biasing said wedge into wedging engagement between said first shaft member and said portion of said plurality of rollers for wedging said portion of said plurality of rollers against said second shaft member and for de-lashing a remainder of said portion of said plurality of rollers relative to said first shaft member and said second shaft member;

wherein said wedge includes a wedge angle substantially equal to eight degrees.

* * * * *